July 5, 1949.  A. W. CARLSON  2,475,007
HOT WATER TANK FITTING
Filed Feb. 27, 1948
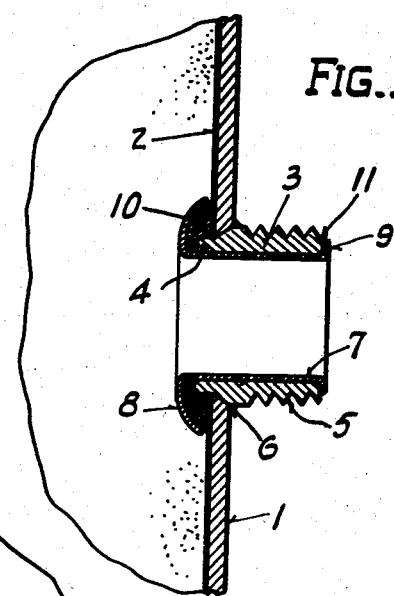
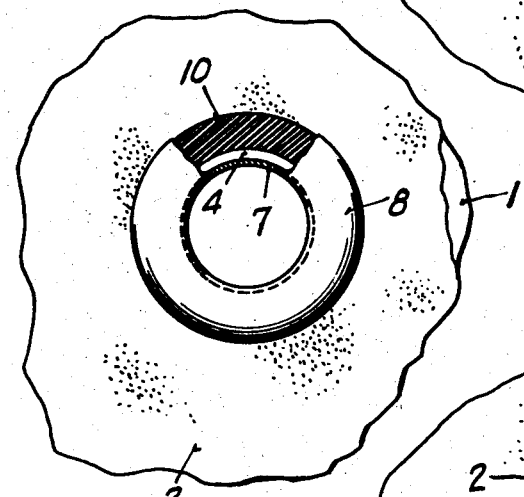
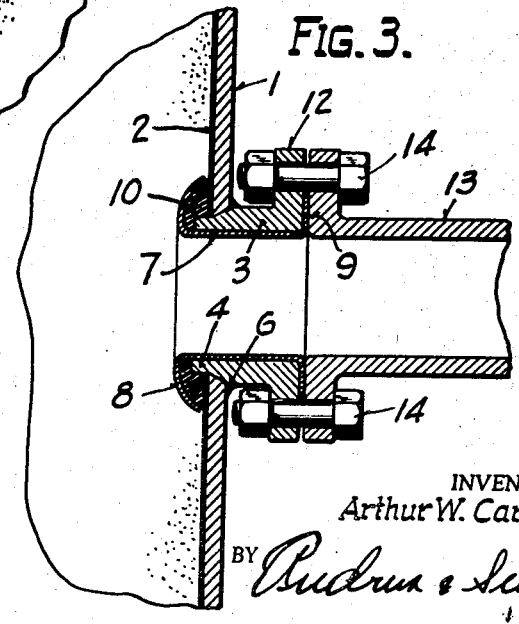
INVENTOR.
Arthur W. Carlson
BY
ATTORNEY.

Patented July 5, 1949

2,475,007

UNITED STATES PATENT OFFICE 2,475,007

HOT-WATER TANK FITTING

Arthur W. Carlson, Kankakee, Ill., assignor to A. O. Smith Corporation, Milwaukee, Wis., a corporation of New York Application February 27, 1948, Serial No. 11,669

5 Claims. (Cl. 285—49)

This invention relates to a hot water tank fitting to receive pipe connections, thermostatic elements and the like and particularly has reference to a fitting for a ceramic enamel lined hot water tank.

One object of the invention is to provide a fitting for a ceramic enamel lined hot water tank which is readily assembled therewith.

Another object is to provide a fitting for a ceramic enamel lined tank which seals off metal parts subject to corrosion against approach by the fluid contained in the tank.

These and other objects of the invention will appear hereinafter in connection with the following description of the drawing illustrating several embodiments of the invention.

In the drawing:

Figure 1 is a sectional view through a tank wall and showing the connection secured in place;

Fig. 2 is an inside elevational view of the fitting applied to the tank with parts broken away to show a portion of the washer in section; and Fig. 3 is a view similar to Figure 1 of another embodiment of the invention.

The drawing shows a portion of the wall 1 of a hot water tank which is lined on the inside with ceramic enamel 2 to protect the metal of the tank wall from injury by corrosion by the contents of the tank.

The connection or fitting employed with tank wall 1 comprises a metal bushing or spud 3 which is disposed within a suitable opening provided in wall 1. The spud projects within the opening a slight distance to provide the cylindrical projecting skirt 4 inside the tank while the main portion of the spud extends outwardly of the tank wall a substantial distance.

The spud 3 is generally of cylindrical shape and the portion projecting from the tank has threads 5 on the outside to receive pipe connections or other fittings and attachments.

That portion of spud 3 located in the tank opening is conical in shape on the outer surface and the edge of the opening is formed complementary thereto for tight engagement therewith when the spud is secured in the opening such as by the electric resistance weld 6.

Spud 3 is preferably made of carbon steel corresponding to the steel in the tank. However, it can be made of a non-corrosive alloy although that is not necessary in view of the construction of the fitting.

A cylindrical generally thin metal sleeve or ferrule 7 is disposed within spud 3. The inner end of ferrule 7 has the generally wide flange 8 while the outer end comprises the flange 9.

A gasket 10, which is of a resilient non-corrosive material such as neoprene, is assembled around projecting skirt 4 of spud 3 on the inside of the tank. The flange 8 of ferrule 7 extends over the end of skirt 4 and the gasket 10 and holds the gasket tightly against enamel lining 2 of wall 1 and the projecting skirt 4 of the spud to seal off any approach of fluid to the spud or the edge of the tank opening.

The outer end flange 9 of the ferrule is flanged against the outer end of spud 3 to seal the ferrule thereto and secure the ferrule in place. Where spud 3 is of carbon steel the flange 9 is joined to the spud at the outer end by solder 11 to insure that the spud will be fully protected.

Ferrule 7 is non-corrosive and may be of a non-corrosive stainless steel alloy or of copper or ordinary steel which is chrome plated or tinned to protect it. Ferrule 7 may be substantially thin because it functions mainly as a protector for the spud and therefore is provided at low cost.

Fig. 3 illustrates another embodiment of the invention. In this embodiment threads 5 on the outside of spud 3 are eliminated and instead the spud is provided at the outer end with the circular flange 12. The outer flange 9 of the ferrule 7 extends over flange 12 and the flanged connection 13 is secured to spud 3 by bolts 14 which extend through the same and circular flange 12 of spud 3. With this construction the carbon spud is adequately protected from contact with corrosive fluid by the overlapping ferrule 7 which is securely clamped in place between spud flange 12 and connection 13.

Under one method of assembling a fitting such as that illustrated in Figs. 1 and 2, the spud 3 is first welded within the opening of tank wall 1 by weld 6. Thereafter the tank wall is lined with the ceramic enamel 2. Gasket 10 is next assembled over projecting skirt 4 of spud 3 and ferrule 7 is then disposed within the spud. The outer end of the ferrule is flanged against the outer end of spud 3 to form flange 9 and is joined to spud 3 by solder 11. The inner end of the ferrule is formed over to provide flange 8 which extends over skirt 4 and engages gasket 10. Flange 8 is formed into tight engagement with gasket 10 and forces the gasket tightly into the corner area between wall 1 and skirt 4 to seal off the approach of fluid to the tank opening. The outer flanged end of ferrule 7 protects the outer end of the spud from contact with corrosive fluid.

The invention provides a novel tank connection assembly which reduces costs and effectively seals off approach of the corrosive contained fluid from metal parts susceptible to attack by corrosion.

Various embodiments of the invention may be employed within the scope of the accompanying claims.

I claim:

1. A fitting assembly for a metal tank having a corrosion protective lining to protect the metal of the tank from corrosive attack by the contents thereof which comprises a metal spud welded within an opening in the wall of said tank and extending on both sides of the tank wall, a resilient corrosion resistant gasket disposed around the inner projecting end of said spud, and a corrosion resistant ferrule assembled within said spud and sealed thereto and having a flange on the inner end thereof extending over the inner end of the spud and forcing said gasket against the tank wall around the spud to seal off approach of the contents of the tank to the fitting opening.

2. A fitting connection for a hot water tank having a ceramic enamel lining to protect the metal of the tank from injury by corrosion from the contents thereof which comprises a metal spud welded within an opening in the wall of said tank and extending on both sides of the tank wall, a resilient corrosion resistant gasket disposed around the inner projecting end of said spud, and a corrosion resistant ferrule assembled within said spud with a flange on the outer end thereof sealed against the outer end of the spud and a flange on the inner end thereof extending over the inner end of the spud and engaging said gasket to press the same tightly against the tank wall around said opening to seal off approach of the contents of the tank to the fitting opening.

3. A fitting connection for a hot water tank having a ceramic enamel lining to protect the metal of the tank from injury by corrosion from the contents thereof, which comprises a metal spud electric resistance welded within an opening in the wall of said tank and extending on both sides of the tank wall with the exterior portion being externally threaded to receive connections or other fittings, a resilient corrosion resistant gasket assembled around the inner projecting end of said spud, and a corrosion resistant ferrule disposed within said spud with a flange on the outer end extending over the outer end of the spud with solder joining the same thereto and a flange on the inner end thereof extending over the inner end of the spud and engaging said gasket to press the same tightly against the tank wall around said opening to seal off approach of the contents of the tank to the fitting opening.

4. A fitting connection for a hot water tank having a ceramic enamel lining to protect the metal of the tank from injury by corrosion from the contents thereof, which comprises a metal spud electric resistance welded within an opening in the wall of said tank and extending on both sides of the tank wall with the outer end of the spud being flanged to receive a flanged fitting, a resilient corrosion resistant gasket assembled around the inner projecting end of said spud, a corrosion resistant ferrule disposed within said spud with a flange on the inner end thereof extending over the inner end of the spud and engaging said gasket to press the same tightly against the tank wall around said opening to seal off approach of the contents of the tank to the fitting opening, and a flange on the outer end of said ferrule formed complementary to the flange on said spud to be interposed between the spud and the flanged fitting secured to the spud to seal the ferrule in place.

5. A fitting assembly for a metal tank having a corrosion protective lining to protect the metal of the tank from corrosive attack by the contents thereof which comprises a metal spud welded within an opening in the wall of said tank, a resilient corrosion resistant gasket disposed at the inner end of said spud, and a corrosion resistant ferrule assembled within said spud and sealed thereto and having a flange on the inner end thereof extending over the inner end of the spud and forcing said gasket against the tank wall around the spud to seal off approach of the contents of the tank to the fitting opening.

ARTHUR W. CARLSON.

No references cited.